(12) United States Patent
Gonzalez

(10) Patent No.: US 6,198,073 B1
(45) Date of Patent: Mar. 6, 2001

(54) DEVICE FOR DE-FOGGING BATHROOM MIRRORS

(76) Inventor: Felix Abaigar Gonzalez, Zamákola 59, 1º izda-drcha, 48003 Bilbao (ES)

( * ) Notice: Subject to any disclaimer, the term of this patent is extended or adjusted under 35 U.S.C. 154(b) by 0 days.

(21) Appl. No.: 09/518,415

(22) Filed: Mar. 3, 2000

(30) Foreign Application Priority Data

Mar. 4, 1999 (ES) .................................... 9900573

(51) Int. Cl.⁷ .................................... H05B 11/00
(52) U.S. Cl. .................................... 219/219
(58) Field of Search .................................... 219/201, 219; 392/386, 392, 394, 396

(56) References Cited

U.S. PATENT DOCUMENTS 5,731,569 * 3/1998 Crescenzo ........................... 219/219

FOREIGN PATENT DOCUMENTS 282980    11/1984   (ES) .

* cited by examiner

Primary Examiner—Tu Ba Hoang
(74) Attorney, Agent, or Firm—Ladas & Parry

(57) ABSTRACT

A deposit (1) or a conventional radiator (1'), duly connected to the hot water system of the space housing mirror (8), a deposit which is flat and adapted in shape and size to mirror (8), and attached to its rear surface either by the cover of deposit (1) itself or through a plate (9) which replaces cover and in any case acts as a damper and diffuser of the heat reaching mirror (8), so that the thermal intensity is suitable and it is evenly distributed throughout the entire surface of the mirror, thus adequately heating it preventing the known fogging due to the humidity saturated atmosphere caused by a shower or bath.

9 Claims, 2 Drawing Sheets

DEVICE FOR DE-FOGGING BATHROOM MIRRORS

OBJECT OF THE INVENTION

The invention relates to a device which prevents a bathroom mirror from fogging as a result of excess steam produced mainly from hot water from the shower, or which allows de-fogging of the mirror surface when it is already fogged.

The object of the invention is to provide a simple and inexpensive device which allows to de-fog the surface of a mirror quickly and fully, although the main objective is to prevent it from fogging in the first place. Naturally, the device is particularly applicable in bathrooms or such places where steam is produced due to heating, such as in showering or bathing of persons.

BACKGROUND OF THE INVENTION

As is well known, when a person showers or bathes with hot water in a bathroom steam is naturally produced, which results in glass surfaces becoming fogged and specifically the surface of a mirror located in such bathroom.

A number of invention Patents and Utility Models are known related to devices for de-fogging bathroom mirrors, which mainly comprise electrical resistors which, duly placed in contact with the rear or silvered surface of the mirror, heat it and thus de-fog the mirrored surface.

Such devices which rely on heating by means of electrical resistors present two fundamental disadvantages: on one hand a high electrical power consumption; and on the other, problems inherent to the installation, as there are safety regulations concerning electrical devices in bathrooms which must be observed, so that providing means of operation involving electrical resistors for heating mirrors or of any other nature in a bathroom involves a certain risk and danger, unless the installation is perfectly carried out with all required safety measures.

Utility Model n° 282.980 describes an improved device for preventing fogging of bathroom mirrors, here employing hot water from the heating radiators, consisting of placing next to the rear face of the mirror a layer of electrically insulating material inside which is included an insulated heat source consisting of low-power electrical resistors, with the property that said Utility Model also claims that the heat source may consist of a coil derived from the heating radiator.

When the device of this Utility Model employs electrical resistors as a heat source to prevent fogging of the mirror it will present the aforementioned disadvantages, that is, a high electrical power consumption and the risk inherent to any electrical devices operating in a bathroom.

However, when the heat source consists of a coil by-passed from the heating radiator, the energy consumption is minimal and, more relevantly, the risk is inexistent, although a basic problem exists, which is that the device will only work when the heating is on, to which must be added that heat transmission between the coil and the mirror is exclusively by radiation, which implies both great heat losses to the air between the coil tubes and de-fogging only in the areas of contact between the coil and the mirror, with a long time required to de-fog the entire surface of the mirror.

DESCRIPTION OF THE INVENTION

The device disclosed has been designed to solve the aforementioned problems in a fully satisfactory manner, with a simple and efficient solution based on providing a fully flat, practically laminar device, in which is contained and/or circulates a volume of heat-transmitting liquid, which is naturally hot or heated by any suitable means, so that such deposit containing the heat-transmitting liquid is attached to the rear surface of the mirror, so that it touches it directly and energy losses are minimal, obtaining de-fogging of the entire mirror surface quickly, when the mirror is already fogged, as a further basic objective of the device is to prevent the mirror from fogging.

In a preferred embodiment the heat-transmission device can be an oil, alcohol or simply water which fills the deposit and is heated by the hot water of a coil communicating to the hot water from the water installation of the household or site where the device is installed, with the coil naturally mounted inside the deposit in order to heat the volume of heat-transmitting liquid.

In a further alternative embodiment the heat-transmitting liquid may be the hot water of the household water installation, which enters the deposit on one end and exits it from the other, after following a labyrinthical path within it in order to heat the entire surface of said deposit efficiently and uniformly, specifically the surface which is meant to be attached to the rear face of the mirror.

The advantages of this device may be summarised as follows:

A faster and more complete de-fogging of the mirror, as the heat transmission between the outer walls of the coil and the liquid in the deposit is greater than between the coil and air, as the latter acts as a thermal insulator and thus heat losses in the present case are lower, that is, heat is transmitted to the mirror more quickly and more efficiently.

A more complete de-fogging of the mirror, since the heat transmission is between the liquid contained in the deposit and the surface of the mirror, causing the simultaneous de-fogging of the entire surface of said mirror.

The de-fogging will take place automatically when the hot water tap of the shower is opened, as the coil water inlet is preferably immediately before the shower outlet, so that as a person is showering hot water is circulating through the coil which heats the water contained in it and thus the surface of the mirror, preventing it from fogging, with the additional property that if the mirror is already fogged it is enough to open the hot water tap of the shower or sink in order to de-fog it.

There are many possible forms for the deposit, but one of the fundamental and invariable characteristics is that it shall be thin or flat and be provided with a cover which will be in contact with the rear surface of the mirror, cover which will preferably be made of a good heat conductor such as copper.

As an option said cover may be embodied in a physically independent element from the deposit itself, specifically as a plate which is attached to said deposit by any conventional mechanical means, which in turn allows said deposit to consist of a conventional radiator so that the cover acts only as a thermal transmission device, by conduction, from the radiator to the mirror, and more specifically as a diffuser which distributes the heat evenly throughout the entire surface of the mirror and as a damper to prevent the high temperature reached in a conventional radiator from being fully and directly transmitted to the mirror.

As can be inferred from the description and advantages related, on e of the properties of the device of the invention is that heat is transmitted to the entire surface of the mirror by heating of a liquid contained in a deposit attached to said mirror so that, when there is no coil and the heating liquid is directly the hot water from the water installation, the device is even simpler and thus more inexpensive.

DESCRIPTION OF THE DRAWINGS

Further characteristics and advantages of the present invention will become apparent in view of the accompanying drawings of an example of a preferred embodiment where, for purposes of illustration only and in no way meant as a definition of the limits of the invention, the following is shown.

PREFERRED EMBODIMENT OF THE INVENTION

Figure 1:
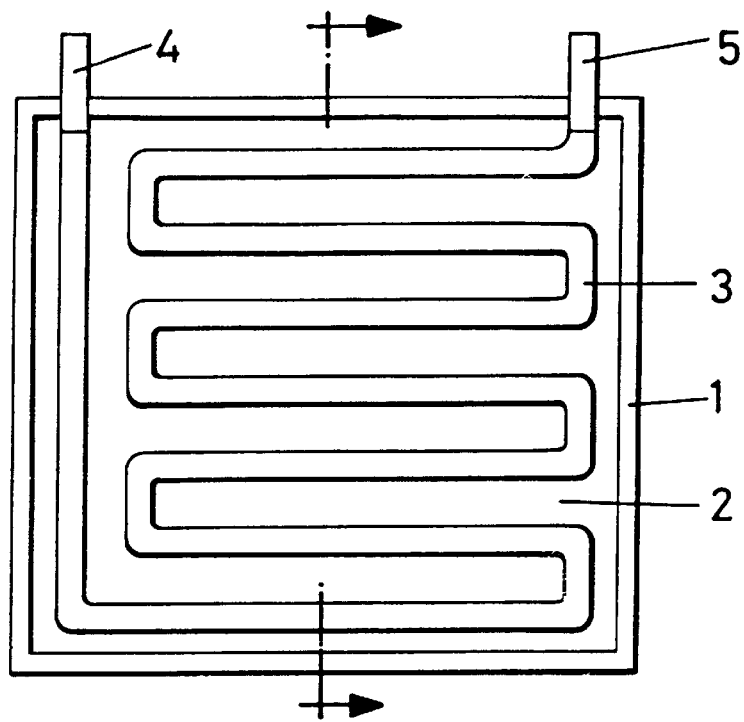
FIG. 1. Shows a frontal schematic representation of the device of the invention, embodied as a flat deposit containing water and inside it a coil through which circulates hot water from the water installation of the household where the device is installed.
Figure 2:
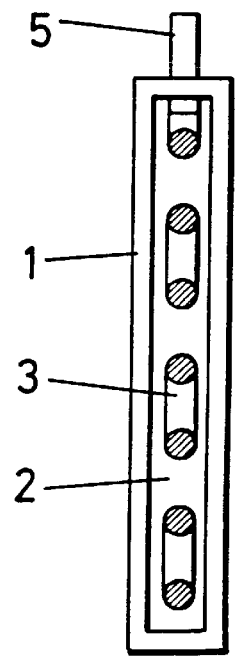
FIG. 2. Shows a schematic representation of a cross section of the device shown in the previous figure.

As may be seen in the above referred drawings, and specifically in FIGS. 1 and 2, the device of the invention comprises a deposit (1) containing a volume of water (2) or of another liquid which transmits heat well, such as alcohol, oil, etc. In any case, said heat transmitting liquid (2) or water contained in deposit (1) will be heated by the hot water which flows inside a coil (3) connected to the water system through the corresponding inlet (4) and outlet (5). Deposit (1) shall be flat, preferably laminar, and provided in the rear with a sealed cover, as since it contains a liquid sealing is required.

This cover shall be made of a good thermal conductor, since transmission of heat to the rear surface of the mirror will take place through it, as deposit (1) and its component elements which form the device itself shall be placed on the rear surface of the mirror.

As liquid (2) contained in deposit (1) is heated by the hot water which flows through coil (3) inside said deposit (1), the corresponding transmission of heat to the mirror will take place, on the entire surface of the mirror as cover is entirely in contact with its rear surface. Naturally, the deposit and in this case rear cover shall have an identical outline to the mirror so that the contact surfaces are identical and heat transmission is maximum.

Figure 3:
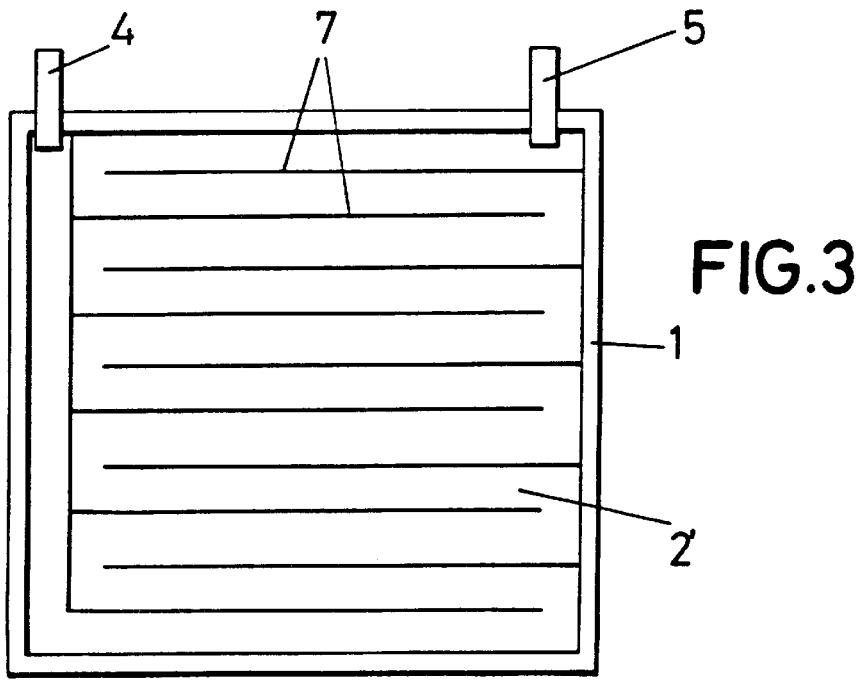
FIG. 3. Shows an alternative embodiment of the same device, where the deposit is provided with partitions which form a labyrinthical path through which shall flow water from the water installation of the household, from an inlet to an outlet of the deposit.

In an alternative embodiment shown in FIG. 3, deposit (1) deposit (1) lacks coil (3), but is provided with the corresponding inlet (4) and outlet (5) for connection to the water system, so that here the heat-transmitting liquid, labelled as (2'), is the hot water of the water system itself, which reaches deposit (1) through inlet (4) and leaves by outlet (5), after following a labyrinthical path inside deposit (1) due to the presence of a number of partitions (7) arranged so that the liquid is forced to follow a winding path in order to heat the entire deposit evenly and fully, obtaining the same effects and advantages as exposed before, although in this case in a simpler and thus less costly manner than in the embodiment described for FIGS. 1 and 2.

Figure 4:
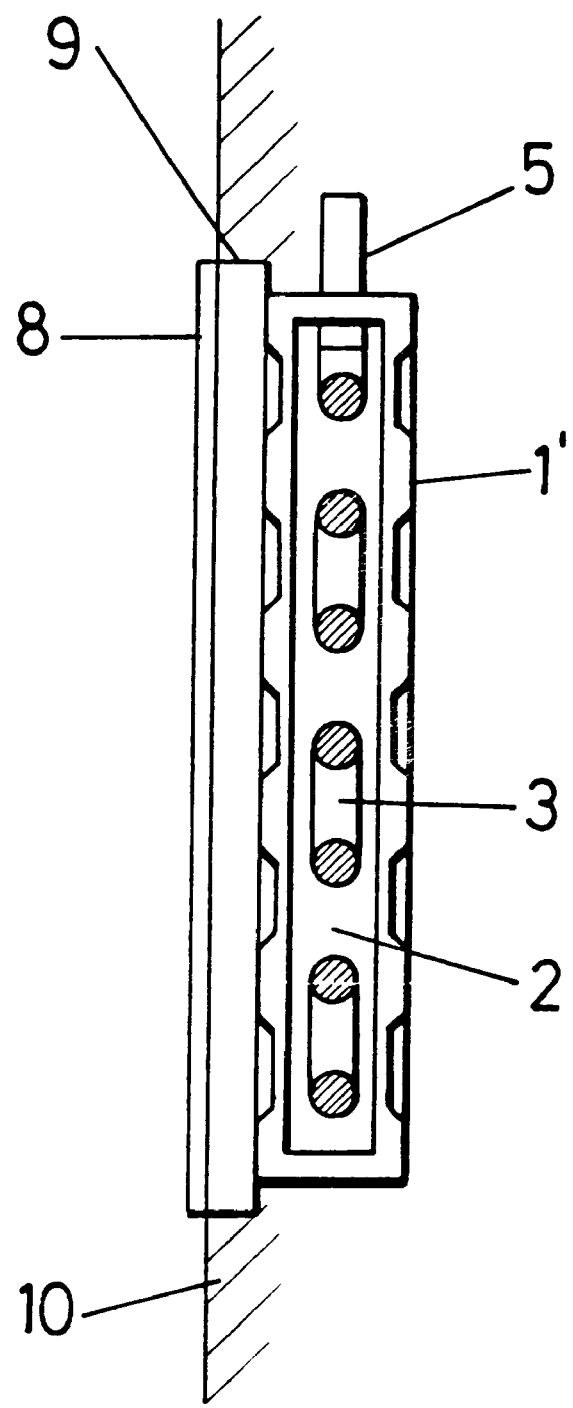
FIG. 4. Shows an enlargement of the cross section of the device, here mounted in a wall and behind the mirror, according to an alternative embodiment in which a conventional radiator is employed as a heat source.

FIG. 4 shows a further alternative embodiment for the device, according to which deposit (1'), which can here be embodied in a conventional radiator provided with a cover and also connected to the hot water system of the household provided with mirror (8), aided by a plate (9) which is approximately equivalent to the cover of the previous embodiments, placed between deposit (1') and mirror (8) and embedded together with deposit (1') in wall (10), which acts as a damper and diffuser for the heat generated in said deposit or radiator (1'), as the temperature of a conventional radiator of this type is excessive, and not suitable to attach directly to the mirror (8), and in addition conventional radiators have surfaces with recesses so that if directly attached to the mirror they would result in an uneven transmission of heat to the mirror as there would be areas of the radiator in direct contact with the mirror and others at a distance from it where a certain heat loss will take place before reaching the mirror.

What is claimed is:

1. A device for de-fogging bathroom mirrors to prevent fogging of a bathroom mirror when there is excess steam caused by hot water from a shower, or to de-fog the surface of the mirror when it is already fogged, comprising a flat deposit (1) of reduced thickness, containing a heat-transmission liquid (2), with one of major surfaces of said deposit (1) having an identical outline to the rear surface of mirror (8) so that they are attached to each other and resulting in corresponding transmission of heat from the liquid contained in said deposit to the mirror, preventing said mirror from fogging, or causing said mirror to de-fog, due to excess steam in the space where the mirror is located; wherein said heat-transmitting liquid (2) completely fills deposit (1) and is heated by the hot water from a hot water system.

2. A device for de-fogging bathroom mirrors, as claimed in claim 1, wherein the deposit (1) contains a coil (3) with a hot water inlet (4) connected to the hot water system, and an outlet (5) also connected to said system, so that circulation of the water through coil (3) results in the heating of heat-transmission liquid (2) contained in the deposit.

3. A device for de-fogging bathroom mirrors, comprising a deposit (1) filled with a heat transmission liquid (2) belongs to a hot water system, said liquid circulating along a labyrinthical path inside said deposit (1), reaching it through an inlet (4) connected to the hot water system and exiting through an outlet (5) also connected to the hot water system, the labyrinthical path defined by partitions (7) suitably arranged inside the deposit (1).

4. A device for de-fogging bathroom mirrors, as claimed in claim 1 wherein said deposit (1) is provided with a cover which forms one of its two major faces, provided with sealing means, said cover made from a good thermal conductor and attached to the rear surface of mirror (8).

5. A device for de-fogging bathroom mirrors, as claimed in claim 1, wherein said deposit (1), provided with a coil (3) and partitions (7) which define a labyrinthical path receiving the hot water from said hot water system to form a radiator (1'), a plate (9) interposed between said deposit and mirror (8), said plate acting as a damper and thermal diffuser, which ensures that suitable thermal levels reach mirror (8) as well as evenly distributed throughout the entire surface of the mirror.

6. Device for de-fogging bathroom mirrors, as claimed in claim 2, wherein said deposit (1) is provided with a cover which forms one of its two major faces, provided with sealing means, said cover made from a good thermal conductor and attached to the rear surface of mirror (8).

7. Device for de-fogging bathroom mirrors, as claimed in claim 3, wherein said deposit (1) is provided with a cover which forms one of its two major faces, provided with sealing means, said cover made from a good thermal conductor and attached to the rear surface of mirror (8).

8. Device for de-fogging bathroom mirrors, as claimed in claim 2, wherein said deposit (1) is provided with said coil (3) and partitions (7) which define a labyrinthical path receiving the hot water from said hot water system to form a radiator (1'), a plate (9) interposed between said deposit and mirror (8), said plate acting as a damper and thermal diffuser, which ensures that suitable thermal levels reach mirror (8) as well as evenly distributed throughout the entire surface of the mirror.

9. Device for de-fogging bathroom mirrors, as claimed in claim 3, wherein said deposit (1), provided with a coil (3) and partitions (7) which define said labyrinthical path receiving the hot water from said hot water system to form a radiator (1'), a plate (9) interposed between said deposit and mirror (8), said plate acting as a damper and thermal diffuser, which ensures that suitable thermal levels reach mirror (8) as well as evenly distributed throughout the entire surface of the mirror.

* * * * *